United States Patent
Zhou et al.

(10) Patent No.: US 10,573,882 B2
(45) Date of Patent: *Feb. 25, 2020

(54) SPHERICAL OR SPHERICAL-LIKE LITHIUM ION BATTERY CATHODE MATERIAL AND PREPARATION METHOD AND APPLICATION THEREOF

(71) Applicant: Guizhou Zhenhua E-Chem Inc., Guiyang (CN)

(72) Inventors: Chaoyi Zhou, Guiyang (CN); Lijuan Wang, Guiyang (CN); Peng Peng, Guiyang (CN); Zhu'an Yin, Guiyang (CN); Ming Mei, Guiyang (CN); Lu Li, Guiyang (CN); Xin Huang, Guiyang (CN); Qianxin Xiang, Guiyang (CN)

(73) Assignee: Guizhou Zhenhua E-CHEM Inc., Guiyang (CN)

( * ) Notice: Subject to any disclaimer, the term of this patent is extended or adjusted under 35 U.S.C. 154(b) by 19 days.

This patent is subject to a terminal disclaimer.

(21) Appl. No.: 15/602,316

(22) Filed: May 23, 2017

(65) Prior Publication Data

US 2018/0083262 A1 Mar. 22, 2018

(30) Foreign Application Priority Data

Sep. 18, 2016 (CN) .......................... 2016 1 0827828

(51) Int. Cl.
| | | |
|---|---|---|
| H01M 4/36 | (2006.01) | |
| H01M 4/505 | (2010.01) | |
| H01M 4/525 | (2010.01) | |
| H01M 4/131 | (2010.01) | |
| C01G 53/00 | (2006.01) | |
| H01M 10/0525 | (2010.01) | |
| H01M 4/02 | (2006.01) | |

(52) U.S. Cl.
CPC ............ *H01M 4/131* (2013.01); *C01G 53/50* (2013.01); *H01M 4/366* (2013.01); *H01M 4/505* (2013.01); *H01M 4/525* (2013.01); *H01M 10/0525* (2013.01); *C01P 2002/20* (2013.01); *C01P 2002/50* (2013.01); *C01P 2002/70* (2013.01); *C01P 2002/72* (2013.01); *C01P 2004/03* (2013.01); *C01P 2004/32* (2013.01); *C01P 2004/50* (2013.01); *C01P 2004/51* (2013.01); *C01P 2004/61* (2013.01); *C01P 2004/62* (2013.01); *C01P 2006/12* (2013.01); *C01P 2006/40* (2013.01); *H01M 2004/028* (2013.01); *H01M 2220/10* (2013.01); *H01M 2220/20* (2013.01); *Y02T 10/7011* (2013.01)

(58) Field of Classification Search
CPC ...... H01M 4/131; H01M 4/366; H01M 4/505; H01M 4/525; H01M 10/0525; H01M 2220/20; H01M 2004/028; H01M 2220/10; C01G 53/50; Y02T 10/7011; C01P 2004/32; C01P 2004/03; C01P 2002/72; C01P 2002/70; C01P 2006/40; C01P 2002/20; C01P 2006/12; C01P 2004/62; C01P 2004/61; C01P 2004/51; C01P 2004/50; C01P 2002/50

See application file for complete search history.

(56) References Cited

U.S. PATENT DOCUMENTS

| | | | | |
|---|---|---|---|---|
| 2011/0033750 A1* | 2/2011 | Hosakawa | ........... | C01G 53/006 429/223 |
| 2012/0045690 A1 | 2/2012 | Xiang et al. | | |

(Continued)

FOREIGN PATENT DOCUMENTS

| | | |
|---|---|---|
| EP | 2264815 A1 | 12/2010 |
| EP | 2523240 A1 | 11/2012 |
| JP | 10308218 A | 11/1998 |

(Continued)

OTHER PUBLICATIONS

European Search Report dated Nov. 3, 2017 in EP 17175187.8.

*Primary Examiner* — Muhammad S Siddiquee (74) *Attorney, Agent, or Firm* — Lathrop GPM LLP (57) ABSTRACT

The present invention discloses a spherical or spherical-like layered structure lithium-nickel-cobalt-manganese composite oxide cathode material as well as preparation methods and applications thereof. A chemical formula of the cathode material is: $Li_aNi_xCo_yMn_zO_2$, wherein, $1.0 \leq a \leq 1.2$, $0.30 \leq x \leq 0.90$, $0.05 \leq y \leq 0.40$, $0.05 \leq z \leq 0.50$, and $x+y+z=1$. The cathode material powder is a single $\alpha$-NaFeO$_2$ type layered structure, and full width at half maximum of 110 diffraction peak which is in the vicinity of the X-ray diffraction angle 2 theta of 64.9° is usually 0.07 to 0.15, and the average crystallite size is usually greater than 900 Å and less than 2000 Å. Under scanning electron microscope, it can be seen that the cathode material is mainly consisted of spherical or spherical-like primary mono-crystal particles and a small amount of secondary agglomerated particles, and wherein, the particle diameter of the primary mono-crystal particles is 0.5 to 10 μm and a cumulative percentage of particles with a particle diameter of less than 0.5 μm is usually greater than 60%. The cathode material provided by the present invention has a integral structure and will not crack or break in a long process of circulation. The material processing performance is good. And the lithium ion battery prepared has excellent high temperature stability, safety and high voltage cycling performance.

6 Claims, 9 Drawing Sheets

(56) References Cited

U.S. PATENT DOCUMENTS

2013/0011726 A1\* 1/2013 Takano .............. C01G 45/1228
            429/188
2015/0093641 A1\* 4/2015 Mitsumoto ........... H01M 4/505
            429/220

FOREIGN PATENT DOCUMENTS

| JP | 2005-053764 | 3/2005 |
| JP | 2009081130 A | 4/2009 |
| KR | 10-2010-0112539 | 10/2010 |
| KR | 10-2013-0058342 | 6/2013 |
| KR | 10-2016-0030090 | 3/2016 |

\* cited by examiner

SPHERICAL OR SPHERICAL-LIKE LITHIUM ION BATTERY CATHODE MATERIAL AND PREPARATION METHOD AND APPLICATION THEREOF

RELATED APPLICATIONS

This application claims priority to CN 201610827828.3, filed Sep. 18, 2016, the contents of which are incorporated herein by reference.

FIELD OF THE INVENTION

The present invention belongs to a technical field of lithium ion battery, and relates to a lithium-nickel-cobalt-manganese composite oxide cathode material of a spherical or spherical-like layered structure, preparation method thereof, and a lithium ion battery made of the cathode material.

BACKGROUND OF THE INVENTION

Since 2014, the global lithium ion battery industry has undergone enormous changes. Mobile digital type lithium ion battery industry entered a low-speed growth phase, while power type lithium ion battery industry showed a continuous spurt. Currently commercial lithium ion battery cathode materials are mainly cobalt oxide ($LiCoO_2$) and lithium-cobalt-nickel-manganese cathode material of a layered structure, and lithium iron phosphate ($LiFePO_4$) of a olivine-type structure. $LiCoO_2$ material has a low specific capacity (140 mAh/g) and cobalt resources are scarce, and the price of $LiCoO_2$ material is high and the safety of which is poor. All the reasons above limited the application of the $LiCoO_2$ material in the power battery. Electric vehicles require lithium ion battery with a higher energy density, a better thermal stability, a better cycle performance and consistency. However, $LiFePO_4$ can not fully meet demands of power lithium ion battery due to large differences among preparation batches, low volume energy density and fast weakening performance under working conditions. Therefore, a layered lithium-nickel-cobalt-manganese cathode material with a higher reversible specific capacity (the actual reversible specific capacity can be as high as 148-190 mAh/g) and a lower price becomes the developing focus of the new generation of power battery materials.

Most of the conventional lithium-nickel-cobalt-manganese cathode material powders are secondary agglomerated particles. The existence of fragmentation of the secondary agglomerated particles during the rolling and cycling after slurry and coating, affects the dispersion uniformity of the active material and the adhesive and the conductive agent and their contact interface with the electrolytic solution, and affects the electrical performance of the battery, especially the safety performance, high temperature stability and cycling performance of battery. So the conventional lithium-nickel-cobalt-manganese cathode material can not meet the high safety requirements of electric vehicle batteries. Therefore, new lithium ion battery cathode material need to be developed.

As reported in the Chinese patent (Application No. 201410128534.2; Publication No. CN104979546A) entitled "Preparation method of single-crystal-morphology lithium ion battery ternary positive material", the ternary precursor was prepared by co-precipitation method, and the precursor was pretreated at high temperature for pelletization, and sintered to obtain mono-crystal primary particles with good dispersibility. As reported in the Chinese patent (Application No. 201510449404.3; Publication No. CN104966833A) entitled "Positive electrode material and preparation method thereof as well as lithium ion battery containing positive electrode material", a ternary precursor was prepared by coprecipitation method, and then the precursor, a lithium source and metal oxide were sintered, crushed, coated and tempered to produce a cathode material of super crystal structure with a smaller crystal volume change and a smaller lithium nickel mixing degree. The cathode material has excellent structural stability and the particle has a few or no grain boundaries. The patent emphasized that the cycling performance and the first charge-discharge efficiency of the lithium ion battery were improved through coating metal element. As reported in the patent (Application No. 201610119296.8; Publication No. CN105633398A) entitled "Preparation method for power type lithium ion battery positive electrode material with primary-particle-like shape", a primary-particle-like shape cobalt source, a lithium source and an additive were mixed and sintered, and then a cobalt source was added, and the mixture was mixed and sintered to obtain the primary particle lithium cobalt oxide cathode material for power type lithium ion battery.

SUMMARY OF THE INVENTION

The technical problem to be solved by the present invention is that, what kind of structure required for a lithium-nickel-cobalt-manganese composite oxide cathode material of a layered structure to give the lithium ion battery a good cycling performance, stability and safety in a high voltage and high temperature condition is not explicitly indicated in the prior art, including the above-mentioned patents.

The present invention aims to provide a lithium-nickel-cobalt-manganese composite oxide cathode material having a spherical or spherical-like layered structure, which is structurally intact and has good processing performance, and can be effective in avoiding the occurrence of the fragmentation of secondary agglomerated particles during the circulation. When the cathode material is applied to a lithium-ion battery, a high temperature stability, high voltage cycling performance and safety performance of the battery can be effectively improved. The chemical formula of the cathode material is:

$Li_aNi_xCo_yMn_zO_2$, wherein $1.0 \le a \le 1.2$, $0.30 \le x \le 0.90$, $0.05 \le y \le 0.40$, $0.05 \le z \le 0.50$, and $x+y+z=1$.

Preferably, wherein, the cathode material comprises a morphology of spherical or spherical-like primary mono-crystal particles and a small amount of secondary agglomerated particles under scanning electron microscopy (SEM); and wherein, the particle diameter of primary mono-crystal particles is 0.5 to 10 μm, and a cumulative percentage of the particles with the particle diameter of less than 5 μm is greater than 60%.

Preferably, wherein the cathode material is characterized in that the cathode material is a single α-$NaFeO_2$ type layered structure shown by a powder X-ray diffraction pattern.

Preferably, wherein in the powder X-ray diffraction spectrum of the cathode material, full width at half maximum (FWHM) of 110 diffraction peak which is in the vicinity of the diffraction angle 2 theta of 64.9° is usually 0.07 to 0.15, and an average crystallite size is greater than or equal to 900 Å and less than or equal to 2000 Å.

Preferably, the lithium-nickel-cobalt-manganese composite oxide cathode material of a spherical or spherical-like layered structure is characterized in that a specific surface area of the cathode material is 0.3 to 0.9 m$^2$/g measured by a BET method.

Preferably, the lithium-nickel-cobalt-manganese composite oxide cathode material of a spherical or spherical-like layered structure is characterized in that a median diameter of the cathode material is 2.0 to 8.0 μm, and preferably a median diameter is 3.0 to 7.0 μm.

The present invention also aims at providing a preparation method for preparing a lithium-nickel-cobalt-manganese oxide cathode material of a spherical or spherical-like layered structure, comprising at least the following steps: mixing a lithium source and a nickel-cobalt-manganese precursor (preferably D50 is from 1 to 12 μm) according to a molar ratio of Li:(Ni+Co+Mn)=(1.0-1.2):1.0; and sintering at 600 to 1000° C. for 4 to 30 hours; and cooling to room temperature; and pulverizing and classifying to obtain the lithium-nickel-cobalt-manganese composite oxide cathode material of a spherical or spherical-like layered structure.

The present invention also aims at providing a preparation method for preparing a lithium-nickel-cobalt-manganese oxide cathode material of a spherical or spherical-like layered structure, comprising at least the following steps: dispersing a lithium source into a polyethylene glycol or an acrylic amide aqueous colloid to prepare a colloid; and adding a nickel-cobalt-manganese precursor into the colloid according to a molar ratio of Li:(Ni+Co+Mn)=(1.0-1.2):1.0 to obtain a mixed material; and drying the mixed material and then sintering at 600 to 1000° C. for 4 to 30 hours; and cooling; and pulverizing and classifying to obtain the lithium-nickel-cobalt-manganese composite oxide cathode material of a spherical or spherical-like layered structure.

The preparation method for the cathode material is characterized in that a median diameter D50 of the nickel-cobalt-manganese precursor is 1 to 12 μm, and preferably 3 to 10 μm, and more preferably 4 to 8 μm.

The preparation method for the cathode material, wherein the lithium source used is one or two or more selected from the group consisting of lithium carbonate, lithium hydroxide monohydrate, lithium nitrate, and lithium acetate.

The preparation method for the cathode material is characterized in that the nickel-cobalt-manganese precursor used is one or two or more selected from the group consisting of nickel-cobalt-manganese hydroxide, nickel-cobalt-manganese carboxyl oxide, and nickel-cobalt-manganese oxide.

The preparation method for the cathode material, wherein the drying temperature is 150 to 350□, the drying time is 2 to 15 hours, and preferably the drying time is 2 to 8 hours.

The present invention also provides a lithium ion battery cathode material obtained by the any one aforementioned preparation method.

The present invention also provides a positive electrode for a lithium ion battery comprising the any one aforementioned cathode material used as a positive electrode active material. Preferably, wherein the positive electrode for a lithium ion battery further comprises a conductive agent, and the conductive agent is preferably a conductive carbon black.

The present invention also provides a lithium ion battery, wherein the battery is prepared by using the any one aforementioned positive electrode, a negative electrode, a separator and an electrolytic solution.

The present invention also provides a storage power station or a mobile storage device, which is prepared by using the aforementioned lithium ion battery.

The present invention also provides a use of the cathode material, or the aforementioned lithium ion battery in the manufacture of mobile digital products (3C), electric vehicles (xEV) or energy storage (ESS) field.

The present invention provides a lithium-nickel-cobalt-manganese composite oxide cathode material which is prepared by mixing a nickel-cobalt-manganese precursor and a lithium source, and then sintering and pulverizing the mixture. Power X-ray diffraction spectrum indicates that the cathode material is a single α-NaFeO$_2$ type layered structure, and full width at half maximum (FWHM) of 110 diffraction peak which is in the vicinity of the diffraction angle 2 theta of 64.9° is usually 0.07 to 0.15, and the average crystallite size is usually greater than 900 Å and less than 2000 Å. Under scanning electron microscope, it can be seen that the cathode material is essentially consisted of spherical or spherical-like primary mono-crystal particles and a small amount of secondary agglomerated particles, and wherein, a particle diameter of primary mono-crystal particles is 0.5 to 10 μm and a cumulative percentage of particles with a particle diameter of less than 5 μm is usually greater than 60%.

The inventors have intensively studied the relationship between crystallinity and battery performance. When full width at half maximum of 110 diffraction peak which is in the vicinity of the diffraction angle 2 theta of 64.9° is in the range of 0.07 to 0.15, the cathode material has good structural stability, and therefore exhibits good electrical properties, and particularly has a better performance at high temperature, high voltage and security.

Compared with the nickel-cobalt-manganese ternary cathode material which is mainly composed of secondary agglomerated particles, the lithium-cobalt-manganese composite oxide cathode material of a spherical or spherical-like layered structure prepared by the present invention is mainly composed of mono-crystal particles, and the content of secondary agglomerated particles is no more than 35%. In the process of circulation, a case of secondary agglomerated particles fragmentation can be effectively avoided. When the cathode material of the present invention is applied to a lithium-ion battery, the battery has more excellent high temperature stability, high voltage cycling performance and good safety performance, and suitable for use in mobile digital products (3C), electric vehicles (xEV), energy storage (ESS) and other products and fields.

The preparation method of the present invention is simple. The preparation process is easy to control and operate, and the production cost is low.

EMBODIMENTS

The present invention will now be described in further detail with reference to specific examples and the accompanying drawings.

With respect to the preparation method for the lithium-nickel-cobalt-manganese composite oxide cathode material of spherical or spherical-like layered structure in the present invention, the cathode material is obtained by one of two methods comprising the following steps:

Method 1: mixing a lithium source and a nickel-cobalt-manganese precursor (D50: 1-12 μm) according to a molar ratio of Li:(Ni+Co+Mn)=(1.0-1.2):1.0; and sintering at 600 to 1000° C. (wherein the rate of heating is preferably set to 10 to 30° C./min during the process of achieving the sintering temperature) for 4 to 30 hours; and cooling; and pulverizing and classifying to obtain the lithium-nickel-cobalt-manganese composite oxide cathode material of a spherical or spherical-like layered structure.

Method 2: dispersing a lithium source in a polyethylene glycol or acrylic amide aqueous colloid to prepare a colloid; and adding a nickel-cobalt-manganese precursor into the colloid according to a molar ratio of Li:(Ni+Co+Mn)=(1.0-1.2):1.0 to obtain a mixed material; and drying the mixed material at 150 to 350° C. for 2 to 15 hours; and then sintering at 600 to 1000° C. (wherein the rate of heating is preferably set to 10 to 30° C./min during the process of achieving the sintering temperature) for 4 to 30 hours; and cooling; and pulverizing and classifying to obtain the lithium-nickel-cobalt-manganese composite oxide cathode material of a spherical or spherical-like layered structure.

The drying equipment used in the invention is: KSF1100-V box type furnace of Yixing Qianjin Furnace Industry Equipment Co., Ltd.

Crushing equipment: SHQM dual planetary ball mill of Lianyungang Chunlong Experimental Instrument Co., Ltd.; Airflow pulverization equipment: MX-50 airflow pulverizer of Yixing Juneng Pulverizing Equipment Company. The pressure of the airflow pulverization in the following Examples 1-8 of the present invention is 0.2-1.0 MPa.

Analytical instruments: British Malvern MSU2000 laser particle size analyzer; British Malvern FPIA3000 flow particle size and shape image analyzer; British Malvern G3 dry particle size and particle shape analyzer; SSA-3500-type automatic surface area analyzer produced and sold by Beijing Biao Electronic Technology Co., Ltd.; Germany Zeiss Supra 55 sapphire field emission scanning electron microscope; Holland Panalytical B.V. X'pert PRU X-ray diffractometer; American thermo iCAP-6300 inductively coupled plasma emission spectrometer; Zhejiang Hangke LIP-3AHB06 high temperature formation system; Wuhan Land CT2001C test equipment; Dongguan City Kerui Electrical KP-BAK-03E-02 high efficiency vacuum oven.

The secondary lithium ion battery of the present invention is composed of an electrode, a non-aqueous electrolyte, a separator and a container. Specifically, the electrode includes a positive electrode and a negative electrode. The positive electrode is made of materials comprising a positive electrode current collector and a positive electrode active material which is coated on the positive electrode current collector, and a conventional adhesive, a conventional conductive additive or the like, wherein the positive electrode active material is the primary spherical or spherical-like lithium-nickel-cobalt-manganese-oxygen material of the present invention. The negative electrode is made of materials comprising a current collector and a conventional negative electrode active material which is coated on the current collector, as well as conventional adhesives, conventional conductive aids and the like. The separator is conventional PP/PE film in the present industry, used for separating the positive electrode and negative electrode from each other. The container is a positive electrode, negative electrode, a separator, and electrolyte inclusion object.

In the following examples, the specific method of making the secondary lithium ion button battery with the lithium-nickel-cobalt-manganese composite oxide cathode material of spherical or spherical-like layered structure prepared by the present invention is as follows:

Preparation of a positive electrode: the lithium nickel-cobalt-manganese composite oxide cathode material of a spherical or spherical-like layered structure of the present invention and a conductive carbon black (SP) and a binder of polyvinylidene fluoride (PVDF) were added into N-methylpyrrolidone (NMP) in a weight ratio of 90:5:5 (a weight ratio of lithium-nickel-cobalt-manganese cathode material to NMP is 2.1:1), and then mixed the materials thoroughly. The mixture was stirred to form a homogeneous slurry. Then the slurry was coated on an aluminum foil current collector, dried and pressed to form a pole piece. The pressed positive pole piece was punched, weighed and baked, and then the battery was assembled in a vacuum glove box. Putted the bottom shell of the button battery first, then putted a foam nickel (2.5 mm) and a negative metal lithium sheet (Tianjin production, 99.9%) on the bottom shell, then injected 0.5 g electrolytic solution in the environment with a relative humidity of less than 1.5%, wherein the electrolytic solution used a mixed solvent of EC, DEC, and DMC with a mass ratio of 1:1:1, and electrolyte was 1M lithium hexafluorophosphate. Then putted the separator, the positive electrode and the button battery cover in turn, and finally sealed the battery. The button battery model is CR2430.

In the following examples, the method of making the secondary lithium ion battery with the lithium-nickel-cobalt-manganese composite oxide cathode material of a spherical or spherical-like layered structure prepared by the present invention is as follows:

Preparation of a positive electrode: the lithium-nickel-cobalt-manganese composite oxide cathode material of a spherical or spherical-like layered structure of the present invention and a conductive carbon black (SP) and a binder of polyvinylidene fluoride (PVDF) were added into N-methylpyrrolidone (NMP) in a weight ratio of 94:3:3 (a weight ratio of lithium-nickel-cobalt-manganese cathode material to NMP is 2.1:1), and then mixed the materials thoroughly. The mixture was stirred to form a homogeneous slurry. Then the slurry was coated on an aluminum foil current collector, dried and pressed to form a pole piece.

Preparation of a negative electrode: a negative artificial graphite and a conductive carbon black (SP), carboxymethyl cellulose (CMC) and an adhesive (SBR) at a weight ratio of 95:1:1:3 were added to a sufficient amount of pure water, and mixed. The mixture was stirred to form a homogeneous slurry. Then the slurry was coated on a copper foil collector, dried and pressed to form a pole piece.

The separator is a PP/PE composite film material. The pressed positive and negative electrode were welded a lug. After inserted the separator between the positive and the negative electrode, the materials were rolled in the winding machine and then put into the soft package fixture, and then sealed the top and side of the soft package. Then the soft package were baked in a oven. And then 9 g of the electrolytic solution was injected into the soft package in an environment where the relative humidity was less than 1.5%. The electrolytic solution was a mixed solvent of DE, DEC, and DMC with a mass ratio of EC:DEC:DMC=1:1:1. The electrolyte was 1M lithium hexafluorophosphate. After formation for 48 hours, the soft package was evacuated and sealed. The battery model was 454261.

The charging and discharging test of the secondary lithium ion experiment battery prepared by the present invention was carried out on Wuhan blue battery tester according to the test method of GB/T18287-2000.

EXAMPLE 1

1.04 mol of lithium hydroxide monohydrate was dispersed into 800 ml of polyethylene glycol aqueous colloid having a mass concentration of 2% to obtain a mixture, and the mixture was stirred at a rotation speed of 100 rpm for 30 minutes to prepare a colloid. Then the hydroxide (D50: 1 µm) of nickel-cobalt-manganese precursor having a molar ratio of Ni:Co:Mn=4:3:3 was added into the colloid according to a molar ratio of Li:(Ni+Co+Mn)=1.04:1.0 to obtain a mixture, and the mixture was stirred at a rotation speed of 3000 rpm for 50 minutes to obtain a mixed material. The mixed material was placed directly into a chamber furnace and dried at 150° C. for 15 hours, and placed in a muffle furnace and sintered at 600° C. at a heating rate of 30° C./min in an air atmosphere for 26 hours. Then the mixed material was cooled to room temperature, and was air-pulverized with air pressure of 1.0 Mpa. Then the mixed material was sieved with a 300 mesh metal sieve to obtain a lithium-nickel-cobalt-manganese composite oxide cathode material A1 of a spherical or spherical-like layered structure.

Figure 1A:
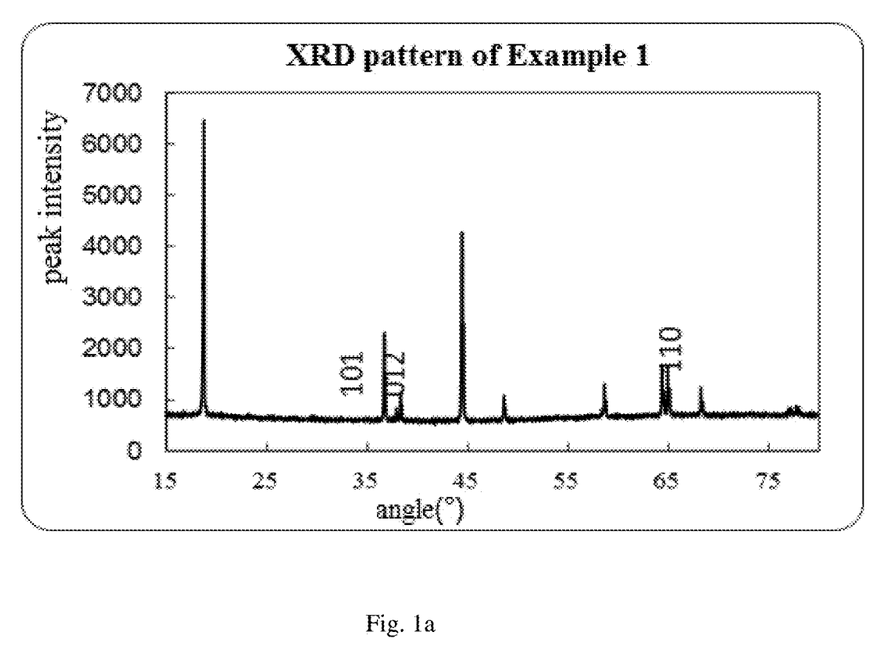
FIG. 1a is a powder X-ray diffraction pattern (XRD) of the lithium-nickel-cobalt-manganese composite oxide cathode material A1 having a spherical or spherical-like layered structure prepared in Example 1.

The cathode material A1 powder was subjected to X-ray diffraction test. As shown in FIG. 1a, the test results showed that full width at half maximum FWHM (110) of the (110) diffraction peak at diffraction angle 2θ of 64.91 was 0.08, the particle grain size was 989 Å, and the structure of the cathode material A1 was a single α-NaFeO$_2$-type layered structure.

Figure 1B:
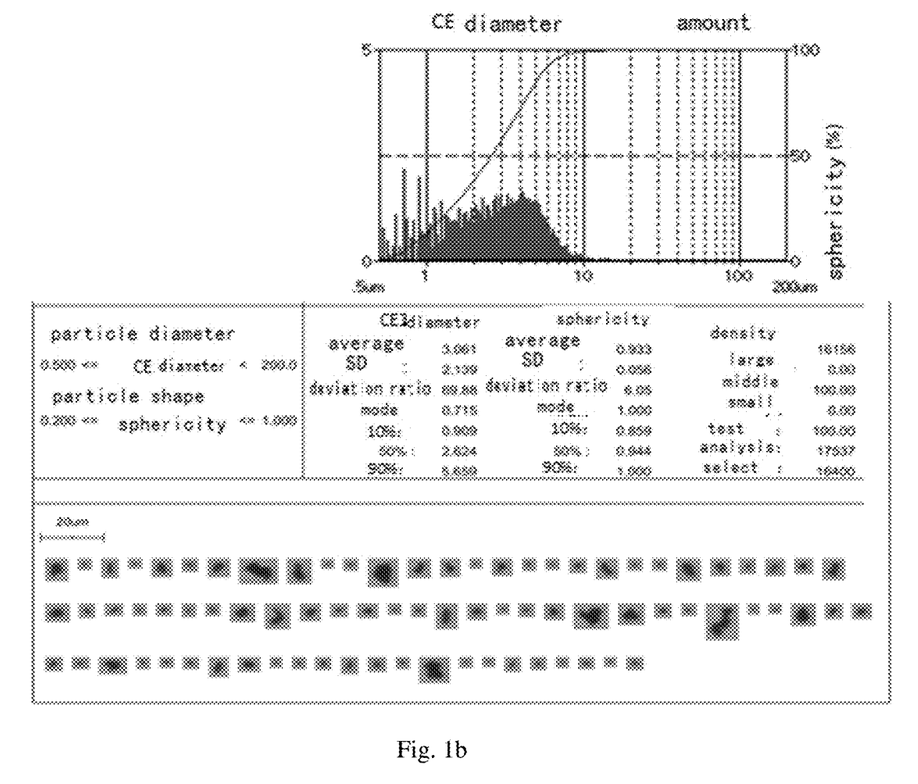
FIG. 1b is a particle size and shape distribution and data graph of the lithium-nickel-cobalt-manganese composite oxide cathode material A1 having a spherical or spherical-like layered structure prepared in Example 1.

The cathode material A1 powder was subjected to grain size and shape image analyses and tests of flowing particles. As shown in FIG. 1b, the particles were spherical or spherical-like shape with an average degree of sphericity of 0.933, and the cumulative percentage of particles having a particle diameter of 5 µm or less was 84.4%.

Figure 1C:
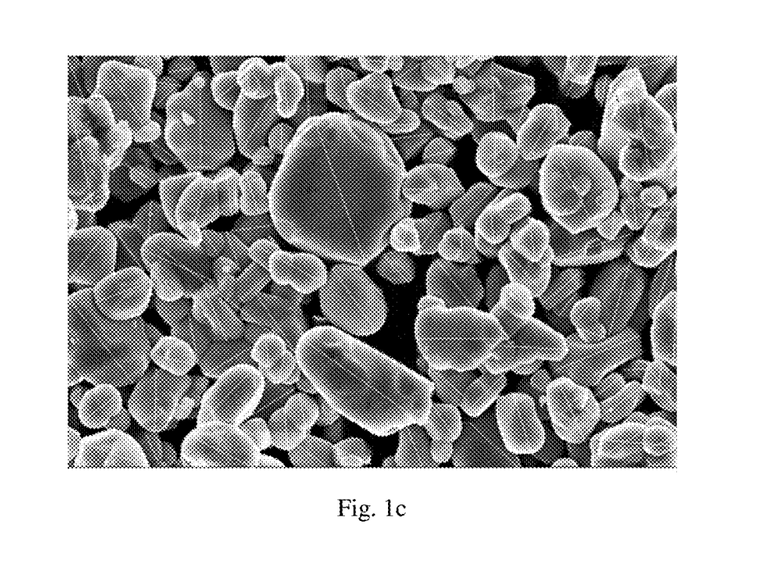
FIG. 1c is a scanning electron micrograph (SEM) of lithium-nickel-cobalt-manganese composite oxide cathode material A1 having a spherical or spherical-like layered structure prepared in Example 1.

The cathode material A1 powder was subjected to a scanning electron microscopy test. As shown in FIG. 1c, it was mainly composed of primary mono-crystal particles having a spherical shape or a spherical-like shape and a small amount of secondary agglomerated particles, wherein the particle diameter of primary mono-crystal particles was 0.6-3.6 µm.

The particle size and specific surface area of the cathode material A1 powder were tested. D50 was 2.2 µm, and the BET surface area was 0.86 m$^2$/g.

The conditions (heating rate, sintering temperature, sintering time, airflow pulverization pressure and product) corresponding to the sintering step of the cathode material A1 were summarized and shown in Table 1. The index data ((110) crystal diffraction angle, full width at half maximum and grain size of the X-ray diffraction, average value of sphericity, cumulative percentage of particles having a particle size of 5 µm or less; single crystal grain size under SEM; D50 and BET) of the cathode material A1 were summarized and shown in Table 2. The performance test results of the battery using the powder A1 as the active material of the cathode material were shown in Table 3.

EXAMPLE 2

1.0 mol of lithium hydroxide monohydrate was dispersed into 750 ml of acrylamide aqueous colloid having a mass concentration of 5% to obtain a mixture, and the mixture was stirred at a rotation speed of 80 rpm for 50 minutes to prepare a colloid. Then the hydroxide (D50: 3 µm) of nickel-cobalt-manganese precursor having a molar ratio of Ni:Co:Mn=6:2:2 was added into the colloid according to a molar ratio of Li:(Ni+Co+Mn)=1.0:1 to obtain a mixture, and the mixture was stirred at a rotation speed of 2800 rpm for 45 minutes to obtain a mixed material. The mixed material was placed directly into a chamber furnace and dried at 230° C. for 8 hours. And then the mixed material was placed in a muffle furnace and sintered at 600° C. at a heating rate of 20° C./min in an oxygen atmosphere for 30 hours. Then the mixed material was cooled to room temperature, and was air-pulverized with air pressure of 0.5 Mpa. Then the mixed material was sieved with a 300 mesh metal sieve to obtain a lithium-nickel-cobalt-manganese composite oxide cathode material A2 of a spherical or spherical-like layered structure.

Figure 2A:
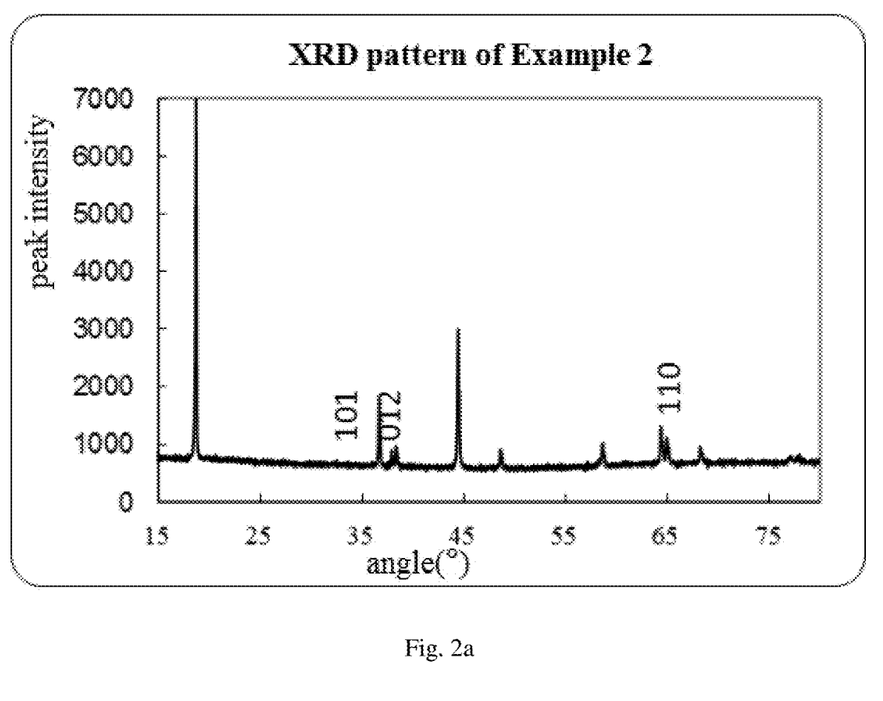
FIG. 2a is a powder X-ray diffraction pattern (XRD) of the lithium-nickel-cobalt-manganese composite oxide cathode material A2 having a spherical or spherical-like layered structure prepared in Example 2.

The cathode material A2 powder was subjected to X-ray diffraction test. As shown in FIG. 2a, the test results showed that full width at half maximum FWHM (110) of the (110) diffraction peak at diffraction angle 2θ of 64.9 was 0.07, the average crystallite size was 900 Å, and the structure of the cathode material A2 was a single α-NaFeO2-type layered structure.

Figure 2B:
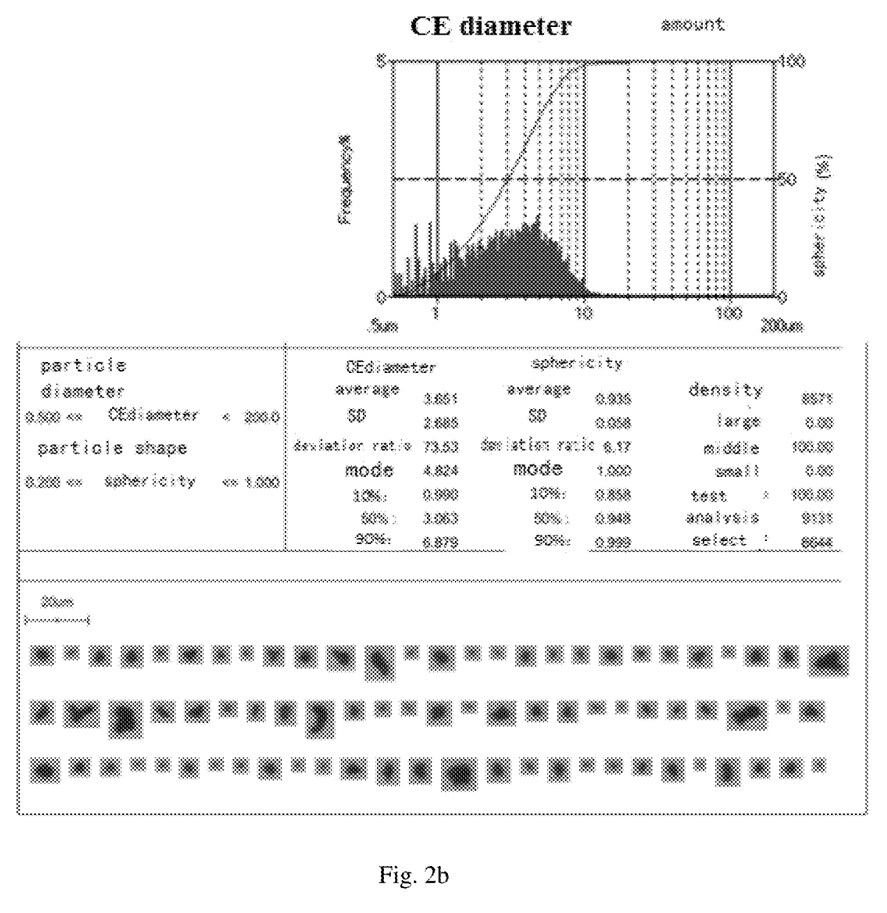
FIG. 2b is a particle size and shape distribution and data graph of the lithium-nickel-cobalt-manganese composite oxide cathode material A2 having a spherical or spherical-like layered structure prepared in Example 2.

The cathode material A2 powder was subjected to grain size and shape image analyses and tests of flowing particles. As shown in FIG. 2b, the particles were spherical or spherical-like shape with an average degree of sphericity of 0.935, and the cumulative percentage of particles having a particle diameter of 5 μm or less was 76.2%.

The cathode material A2 powder was subjected to a scanning electron microscopy test. It was mainly composed of primary mono-crystal particles having a spherical shape or a spherical-like shape and a small amount of secondary agglomerated particles, wherein the particle diameter of primary mono-crystal particles was 0.7-4.8 μm.

The particle size and specific surface area of the cathode material A2 powder were tested. D50 was 3.0 μm, and the BET surface area was 0.82 m$^2$/g.

The conditions (heating rate, sintering temperature, sintering time, airflow pulverization pressure and product) corresponding to the sintering step of the cathode material A2 were summarized and shown in Table 1. The index data ((110) crystal diffraction angle, full width at half maximum and grain size of the X-ray diffraction, average value of sphericity, cumulative percentage of particles having a particle size of 5 μm or less; single crystal grain size under SEM; D50 and BET) of the cathode material A2 were summarized and shown in Table 2. The performance test results of the battery using the powder A2 as the active material of the cathode material were shown in Table 3.

EXAMPLE 3

Lithium carbonate was mixed with the hydroxide (D50: 7.5 μm) of nickel-cobalt-manganese precursor having a molar ratio of Ni:Co:Mn=5:2:3 according to a molar ratio of Li:(Ni+Co+Mn)=1.2:1 to obtain a mixture. Then the mixture was ball-milled at a rotation speed of 200 rpm for 60 min and mixed evenly and discharged. Then the mixture was placed in a muffle furnace and sintered at 1000° C. at a heating rate of 13° C./min in an air atmosphere for 4 hours. Then the mixture was cooled to room temperature, and air-pulverized with air pressure of 0.8 Mpa. Then the mixture was sieved with a 300 mesh metal sieve to obtain a lithium-nickel-cobalt-manganese composite oxide cathode material A3 of a spherical or spherical-like layered structure.

The cathode material A3 powder was subjected to X-ray diffraction test. The test results showed that the full width at half maximum FWHM (110) of the (110) diffraction peak at diffraction angle 2θ of 64.89 was 0.15, grain size was 2000 Å, and the structure of the cathode material A3 was a single α-NaFeO$_2$-type layered structure.

The cathode material A3 powder was subjected to grain size and shape image analyses and tests of flowing particles. The particles were spherical or spherical-like shape with an average degree of sphericity of 0.949, and the cumulative percentage of particles having a particle diameter of 5 μm or less was 85.8%.

Figure 3:
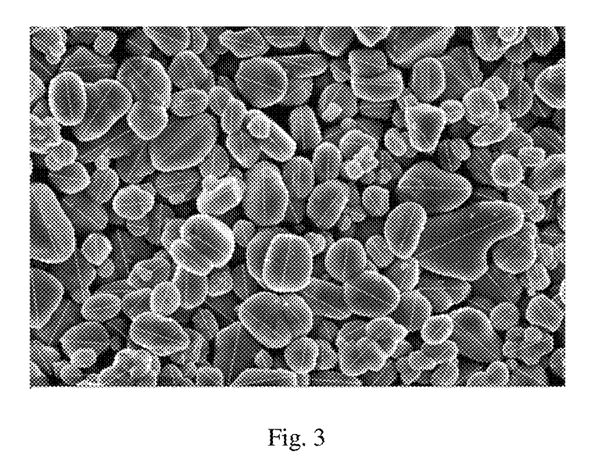
FIG. 3 is a scanning electron micrograph (SEM) of the lithium-nickel-cobalt-manganese composite oxide cathode material A3 having a spherical or spherical-like layered structure prepared in Example 3.

The cathode material A3 powder was subjected to a scanning electron microscopy test. As shown in FIG. 3, it was mainly composed of primary mono-crystal particles having a spherical shape or a spherical-like shape and a small amount of secondary agglomerated particles, wherein the particle diameter of primary mono-crystal particles was 0.8-7.8 μm.

The particle size and specific surface area of the cathode material A3 powder were tested. D50 was 6.4 μm, and the BET surface area was 0.58 m$^2$/g.

The conditions (heating rate, sintering temperature, sintering time, airflow pulverization pressure and product) corresponding to the sintering step of the cathode material A3 were summarized and shown in Table 1. The index data ((110) crystal diffraction angle, full width at half maximum, grain size, average value of sphericity, cumulative percentage of particles having a particle size of 5 μm or less; single crystal grain size under SEM; D50 and BET) of the cathode material A3 were summarized and shown in Table 2. The performance test results of the battery using the powder A3 as the active material of the cathode material were shown in Table 3.

EXAMPLE 4

Lithium nitrate was mixed with the hydroxide (D50: 10.0 μm) of nickel-cobalt-manganese precursor having a molar ratio of Ni:Co:Mn=1:1:1 according to a molar ratio of Li:(Ni+Co+Mn)=1.16:1 to obtain a mixture. Then the mixture was ball-milled at a rotation speed of 1000 rpm for 10 min and mixed evenly and discharged. And then the mixture was placed in a muffle furnace and sintered at 920° C. at a heating rate of 10° C./min in an air atmosphere for 12 hours. Then the mixture was cooled to room temperature, and air-pulverized with air pressure of 0.2 Mpa. Then the mixture was sieved with a 300 mesh metal sieve to obtain a lithium-nickel-cobalt-manganese composite oxide cathode material A4 of a spherical or spherical-like layered structure.

Figure 4A:
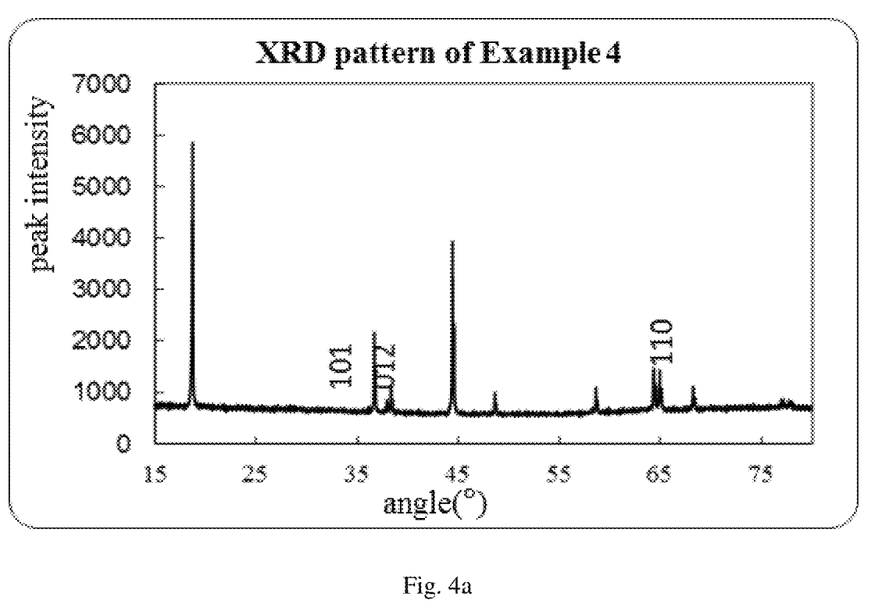
FIG. 4a is a powder X-ray diffraction pattern (XRD) of the lithium-nickel-cobalt-manganese composite oxide cathode material A4 having a spherical or spherical-like layered structure prepared in Example 4.

The cathode material A4 powder was subjected to X-ray diffraction test. As shown in FIG. 4a, the test results showed that the full width at half maximum FWHM (110) of the (110) diffraction peak at diffraction angle 2θ of 64.86 was 0.13, grain size was 1653 Å, and the structure of the cathode material A4 was a single α-NaFeO$_2$-type layered structure.

Figure 4B:
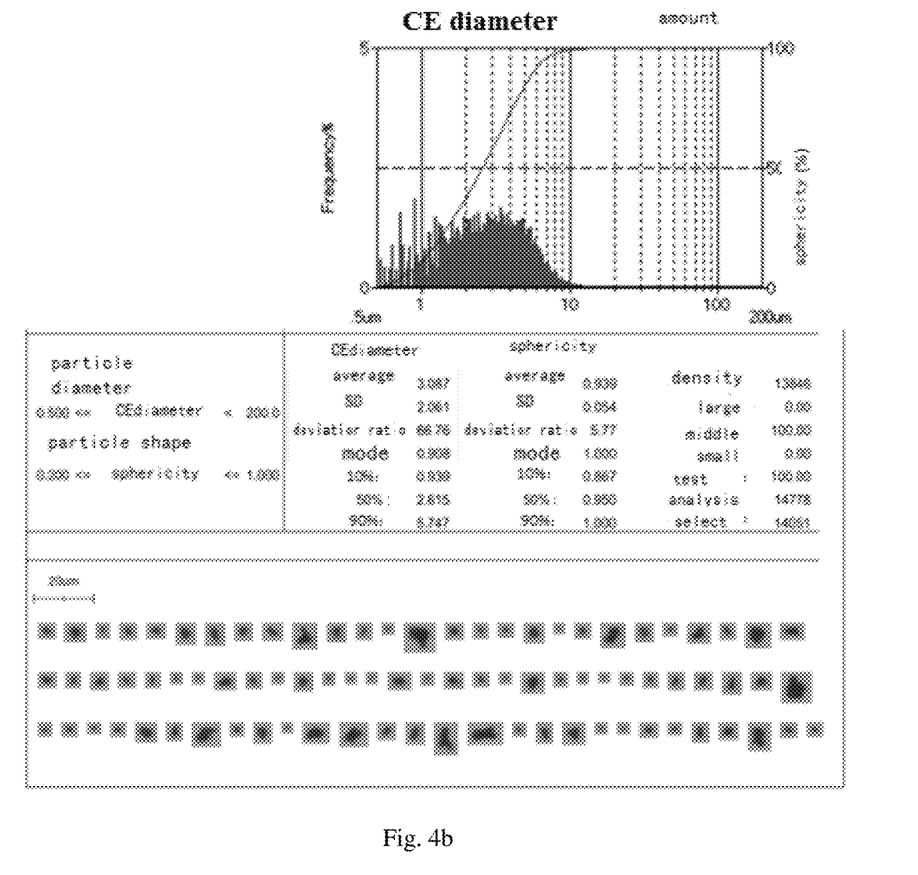
FIG. 4b is a particle size and shape distribution and data graph of the lithium-nickel-cobalt-manganese composite oxide cathode material A4 of a spherical or spherical-like layered structure prepared in Example 4.
Figure 4C:
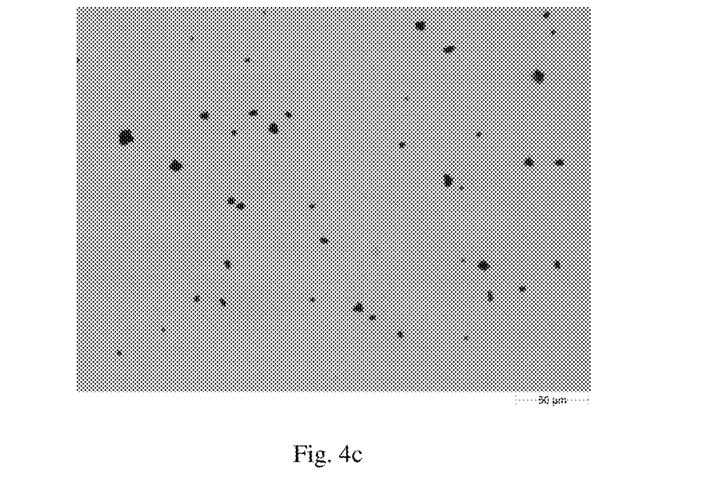
FIG. 4c is a particle high resolution image of the lithium-nickel-cobalt-manganese composite oxide cathode material A4 having a spherical or spherical-like layered structure prepared in Example 4.

The cathode material A4 powder was subjected to dry particle size and shape image analyses and tests. As shown in FIG. 4b and FIG. 4c, the particles were spherical or spherical-like shape with an average degree of sphericity of 0.939, and the cumulative percentage of particles having a particle diameter of 5 μm or less was 84.19%.

The cathode material A4 powder was subjected to a scanning electron microscopy test. It was mainly composed of primary mono-crystal particles having a spherical shape or a spherical-like shape and a small amount of secondary agglomerated particles, wherein the particle diameter of primary mono-crystal particles was 0.6-6.8 μm.

The particle size and specific surface area of the cathode material A4 powder were tested. D50 was 5.2 μm, and the BET surface area was 0.54 m$^2$/g.

The conditions (heating rate, sintering temperature, sintering time, airflow pulverization pressure and product) corresponding to the sintering step of the cathode material A4 were summarized and shown in Table 1. The index data ((110) crystal diffraction angle, full width at half maximum and grain size of the X-ray diffraction, average value of sphericity, cumulative percentage of particles having a particle size of 5 μm or less; single crystal grain size under SEM; D50 and BET) of the cathode material A4 were summarized and shown in Table 2. The performance test results of the battery using the powder A4 as the active material of the cathode material were shown in Table 3.

EXAMPLE 5

1.05 mol of lithium hydroxide monohydrate was dispersed into 600 ml of mixed aqueous colloid composed of polyethyleneglycol having a mass concentration of 3% and acrylamide having a mass concentration of 2% to obtain a mixture, and the mixture was stirred at a rotation speed of 65 rpm for 90 minutes to prepare a colloid. Then the oxide (D50: 5.0 μm) of nickel-cobalt-manganese precursor having a molar ratio of Ni:Co:Mn=1:1:1 was added into the colloid according to a molar ratio of Li:(Ni+Co+Mn)=1.05:1 to obtain a mixture, and then stirred the mixture at a rotation speed of 2600 rpm for 40 minutes to obtain a mixed material. The mixed material was placed directly into an chamber furnace and dried at 350° C. for 2 hours. And then the mixed material was placed in a muffle furnace and sintered at 700° C. at a heating rate of 25° C./min in an air atmosphere for 22 hours. Then the mixed material was cooled to room temperature, and air-pulverized with air pressure of 0.3 Mpa. Then the mixed material was sieved with a 300 mesh metal sieve to obtain a lithium-nickel-cobalt-manganese composite oxide cathode material A5 of a spherical or spherical-like layered structure.

The cathode material A5 powder was subjected to X-ray diffraction test. The test results showed that the full width at half maximum FWHM (110) of the (110) diffraction peak at diffraction angle 2θ of 64.88 was 0.09, grain size was 1058 Å, and the structure of the cathode material A5 was a single α-NaFeO$_2$-type layered structure.

Figure 5:
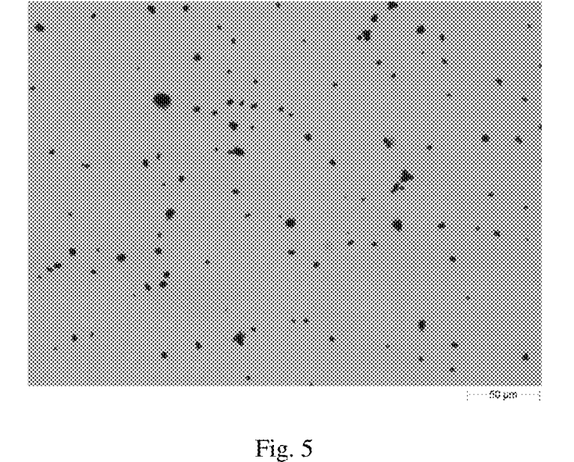
FIG. 5 is a particle high resolution image of the lithium-nickel-cobalt-manganese composite oxide cathode material A5 having a spherical or spherical-like layered structure prepared in Example 5.

The cathode material A5 powder was subjected to grain size and shape image analyses and tests of flowing particles. As shown in FIG. 5, the particles were spherical or spherical-like shape with an average degree of sphericity of 0.931, and the cumulative percentage of particles having a particle diameter of 5 μm or less was 72.1%.

The cathode material A5 powder was subjected to a scanning electron microscopy test. It was mainly composed of primary mono-crystal particles having a spherical shape or a spherical-like shape and a small amount of secondary agglomerated particles, wherein the particle diameter of primary mono-crystal particles was 0.5-4.4 μm.

The particle size and specific surface area of the cathode material A5 powder were tested. D50 was 4.5 μm, and the BET surface area was 0.69 m$^2$/g.

The conditions (heating rate, sintering temperature, sintering time, airflow pulverization pressure and product) corresponding to the sintering step of the cathode material A5 were summarized and shown in Table 1. The index data ((110) crystal diffraction angle, full width at half maximum and grain size of the X-ray diffraction, average value of sphericity, cumulative percentage of particles having a particle size of 5 μm or less; single crystal grain size under SEM; D50 and BET) of the cathode material A5 were summarized and shown in Table 2. The performance test results of the battery using the powder A5 as the active material of the cathode material were shown in Table 3.

EXAMPLE 6

Lithium carbonate was mixed with the composite of manganese acetate, cobalt acetate and nickel acetate (produced and sold by Guizhou Zhenhua) (D50: 4 μm) of nickel-cobalt-manganese precursor having a molar ratio of Ni:Co:Mn=5:2:3 according to a molar ratio of Li:(Ni+Co+Mn)=1.18:1 to obtain a mixture. Then the mixture was ball-milled at a rotation speed of 900 rpm for 13 min and mixed evenly and discharged. And then the mixture was placed in a muffle furnace and sintered at 960□ at a heating rate of 15□/min in an air atmosphere for 8 hours. Then the mixture was cooled to room temperature, and air-pulverized with air pressure of 0.7 Mpa. Then the mixture was sieved with a 300 mesh metal sieve to obtain a lithium-nickel-cobalt-manganese composite oxide cathode material A6 of a spherical or spherical-like layered structure.

The cathode material A6 powder was subjected to X-ray diffraction test. The test results showed that the full width at half maximum FWHM (110) of the (110) diffraction peak at diffraction angle 2θ of 64.97 was 0.14, grain size was 1772 Å, and the structure of the cathode material A6 was a single α-NaFeO$_2$-type layered structure.

The cathode material A6 powder was subjected to grain size and shape image analyses and tests of flowing particles. The particles were spherical or spherical-like shape with an average degree of sphericity of 0.918, and the cumulative percentage of particles having a particle diameter of 5 μm or less was 74.5%.

Figure 6:
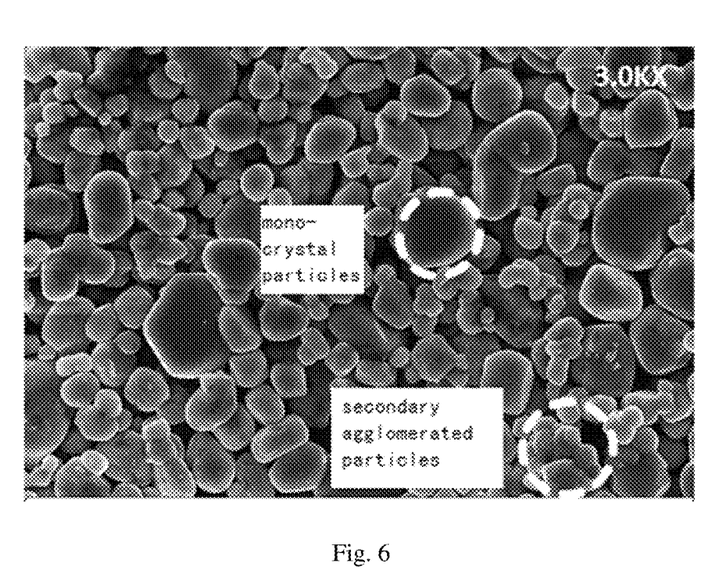
FIG. 6 is a scanning electron micrograph (SEM) of the lithium-nickel-cobalt-manganese composite oxide cathode material A6 having a spherical or spherical-like layered structure prepared in Example 6.

The cathode material A6 powder was subjected to a scanning electron microscopy test. As shown in FIG. 6, it was mainly composed of primary mono-crystal particles having a spherical shape or a spherical-like shape and a small amount of secondary agglomerated particles, wherein the particle diameter of primary mono-crystal particles was 0.9-6.7 μm.

The particle size and specific surface area of the cathode material A6 powder were tested. D50 was 3.8 μm, and the BET surface area was 0.62 m$^2$/g.

The conditions (heating rate, sintering temperature, sintering time, airflow pulverization pressure and product) corresponding to the sintering step of the cathode material A6 were summarized and shown in Table 1. The index data ((110) crystal diffraction angle, full width at half maximum and grain size of X-ray diffraction, average value of sphericity, cumulative percentage of particles having a particle size of 5 μm or less; single crystal grain size under SEM; D50 and BET) of the cathode material A6 were summarized and shown in Table 2. The performance test results of the battery using the powder A6 as the active material of the cathode material were shown in Table 3.

EXAMPLE 7

1.10 mol of lithium hydroxide monohydrate was dispersed into 650 ml of polyethylene glycol aqueous colloid having a mass concentration of 4% to obtain a mixture, and the mixture was stirred at a rotation speed of 70 rpm for 70 minutes to prepare a colloid. Then the oxide (D50: 8.0 μm) of nickel-cobalt-manganese precursor having a molar ratio of Ni:Co:Mn=8:1:1 was added into the colloid according to a molar ratio of Li:(Ni+Co+Mn)=1.10:1 to obtain a mixture, and the mixture was stirred at a rotation speed of 2000 rpm for 30 minutes to obtain a mixed material. The mixed material was placed directly into an chamber furnace and dried at 300° C. for 5 hours. And then the mixed material was placed in a muffle furnace and sintered at 850° C. at a heating rate of 23° C./min in an air atmosphere for 18 hours. Then the mixed material was cooled to room temperature, and air-pulverized with air pressure of 0.4 Mpa. Then the mixed material was sieved with a 300 mesh metal sieve to obtain a lithium-nickel-cobalt-manganese composite oxide cathode material A7 of spherical or spherical-like layered structure.

The cathode material A7 powder was subjected to X-ray diffraction test. The test results showed that the full width at half maximum FWHM (110) of the (110) diffraction peak at diffraction angle 2θ of 64.98 was 0.11, grain size was 1231 Å, and the structure of the cathode material A7 was a single α-NaFeO$_2$-type layered structure.

The cathode material A7 powder was subjected to grain size and shape image analyses and tests of flowing particles. The particles were spherical or spherical-like shape with an average degree of sphericity of 0.913, and the cumulative percentage of particles having a particle diameter of 5 μm or less was 88.7%.

The cathode material A7 powder was subjected to a scanning electron microscopy test. It was mainly composed of primary mono-crystal particles having a spherical shape or a spherical-like shape and a small amount of secondary agglomerated particles, wherein the particle diameter of primary mono-crystal particles was 0.7~6.3 μm.

The particle size and specific surface area of the cathode material A7 powder were tested. D50 was 7.6 μm, and the BET surface area was 0.46 m$^2$/g.

The conditions (heating rate, sintering temperature, sintering time, airflow pulverization pressure and product) corresponding to the sintering step of the cathode material A7 were summarized and shown in Table 1. The index data ((110) crystal diffraction angle, full width at half maximum and grain size of X-ray diffraction, average value of sphericity, cumulative percentage of particles having a particle size of below 5 μm; single crystal grain size under SEM; D50 and BET) of the cathode material A7 were summarized and shown in Table 2. The performance test results of the battery using the powder A7 as the active material of the cathode material were shown in Table 3.

EXAMPLE 8

Lithium acelate was mixed with the oxide (D50: 12 μm) of nickel-cobalt-manganese precursor having a molar ratio of Ni:Co:Mn=4:3:3 according to a molar ratio of Li:(Ni+Co+Mn)=1.15:1 to obtain a mixture. Then the mixture was ball-milled at a rotation speed of 850 rpm for 15 min and mixed evenly and discharged. And then the mixture was placed in a muffle furnace and sintered at 750° C. at a heating rate of 18° C./min in an air atmosphere for 20 hours. Then the mixture was cooled to room temperature, and air-pulverized with air pressure of 0.6 Mpa. Then the mixture was sieved with a 300 mesh metal sieve to obtain a lithium-nickel-cobalt-manganese composite oxide cathode material A8 of a spherical or spherical-like layered structure.

Figure 7:
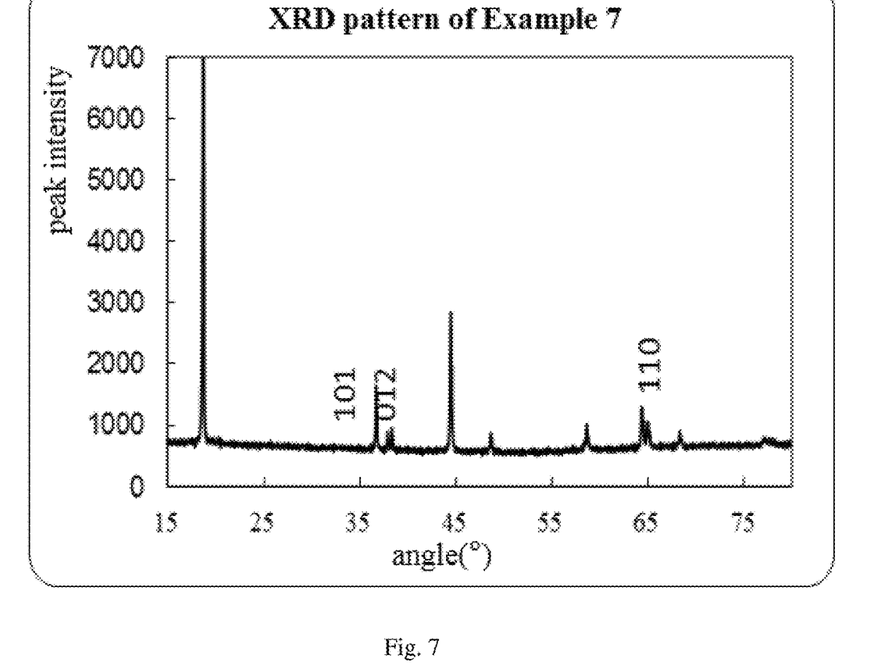
FIG. 7 is a powder X-ray diffraction pattern (XRD) of the lithium-nickel-cobalt-manganese composite oxide cathode material A8 having a spherical or spherical-like layered structure prepared in Example 8.

The cathode material A8 powder was subjected to X-ray diffraction test. As shown in FIG. 7, the test results showed that the full width at half maximum FWHM (110) of the (110) diffraction peak at diffraction angle 2θ of 64.92 was 0.10, grain size was 1487 Å, and the structure of the cathode material A8 was a single α-NaFeO$_2$-type layered structure.

The cathode material A8 powder was subjected to dry particle size and shape image analyses and tests. The particles were spherical or spherical-like shape with an average degree of sphericity of 0.905, and the cumulative percentage of particles having a particle diameter of 5 μm or less was 90.2%.

The cathode material A8 powder was subjected to a scanning electron microscopy test. It was mainly composed of primary mono-crystal particles having a spherical shape or a spherical-like shape and a small amount of secondary agglomerated particles, wherein the particle diameter of primary mono-crystal particles was 0.5-9.2 μm.

The particle size and specific surface area of the cathode material A8 powder were tested. D50 was 8.0 μm, and the BET surface area was 0.30 m$^2$/g.

The conditions (heating rate, sintering temperature, sintering time, airflow pulverization pressure and product) corresponding to the sintering step of the cathode material A8 were summarized and shown in Table 1. The index data ((110) crystal diffraction angle, full width at half maximum and grain size of X-ray diffraction, average value of sphericity, cumulative percentage of particles having a particle size of below 5 μm; single crystal grain size under SEM; D50 and BET) of the cathode material A8 were summarized and shown in Table 2. The performance test results of the battery using the powder A8 as the active material of the cathode material were shown in Table 3.

COMPARATIVE EXAMPLE

Commercial cobalt-nickel-manganese ternary cathode material ZH5000S of Guizhou Zhenhua E-CHEM Co., Ltd.

The method of preparing the cathode material ZH5000S is as follows: lithium carbonate was mixed with the oxide (D50: 6.5 μm) of nickel-cobalt-manganese precursor having a molar ratio of Ni:Co:Mn=5:2:3 according to a molar ratio of Li:(Ni+Co+Mn)=1.06:1 to obtain a mixture. Then the mixture was ball-milled at a rotation speed of 750 rpm for 20 min and mixed evenly and discharged. And then the mixture was placed in a muffle furnace and sintered at 930° C. at a heating rate of 35° C./min in an air atmosphere for 10 hours. Then the mixture was cooled to room temperature naturally, and ball-milled at a rotation speed of 1500 rpm for 30 min and discharged. Then the mixture was sieved with a 300 mesh metal sieve to obtain the cobalt-nickel-manganese ternary cathode material ZH5000S.

Figure 8A:
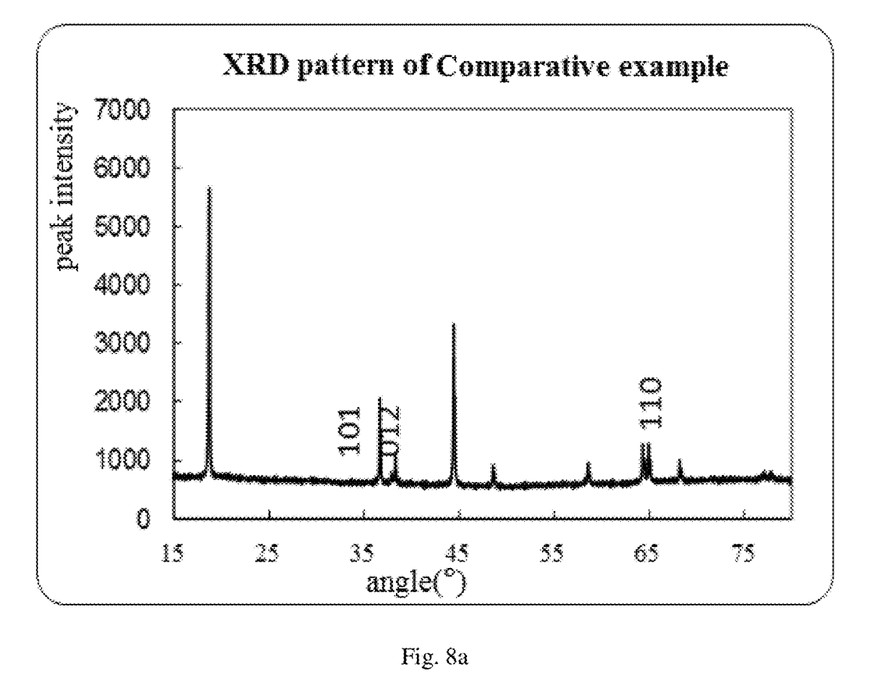
FIG. 8a is a powder X-ray diffraction pattern (XRD) of the comparative example ZH5000S.

The cathode material powder was subjected to X-ray diffraction test. As shown in FIG. 8a, the test results showed that the FWHM (110) of the (110) diffraction peak at diffraction angle 2θ of 64.95 was 0.18, grain size was 608 Å, and the structure of the cathode material was a single α-NaFeO$_2$-type layered structure.

Figure 8B:
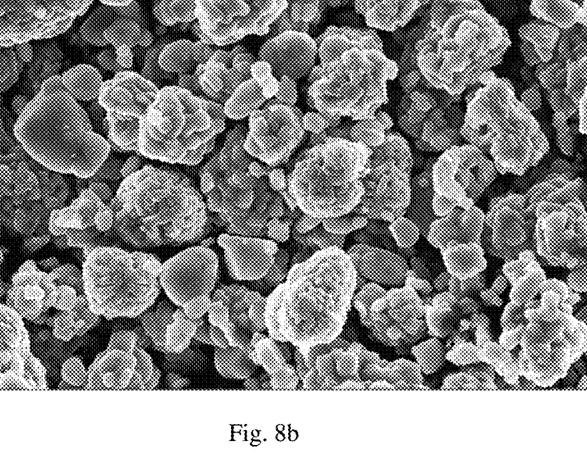
FIG. 8b is a scanning electron micrograph (SEM) of the comparative example ZH5000S.
Figure 9:
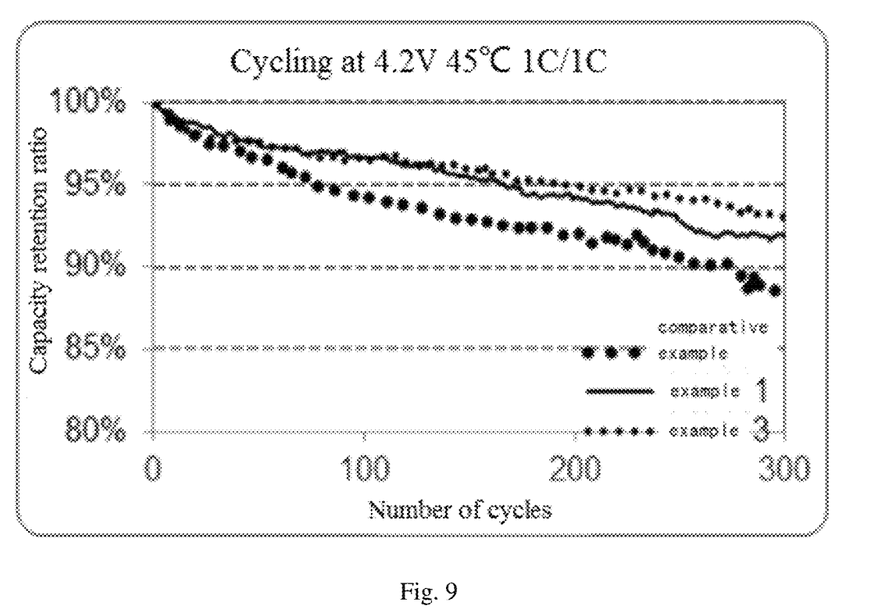
FIG. 9 is a comparison graph of charge/discharge cycle graphs of 1.0 C/1.0 C for 300 cycles at 4.2 V at 45° C. of all the examples and comparative examples.

The cathode material powder was subjected to a scanning electron microscopy test. As shown in FIG. 8b, it was mainly composed of secondary agglomerated particles and less than 5% of primary particles The particle size and specific surface area of the cathode material powder were tested. D50 was 6.6 μm, and the BET surface area was 0.72 m$^2$/g.

The conditions (heating rate, sintering temperature, sintering time, airflow pulverization pressure and product) corresponding to the sintering step of the cathode material ZH5000S were summarized and shown in Table 1. The index data ((110) crystal diffraction angle, full width at half maximum and grain size of X-ray diffraction, average value of sphericity, cumulative percentage of particles having a particle size of below 5 μm; single crystal grain size under SEM; D50 and BET) of the cathode material ZH5000S were summarized and shown in Table 2. The performance test results of the battery using the powder ZH5000S as the active material of the cathode material were shown in Table 3.

TABLE 1

| Example | Heating Rate ° C./min | Sintering Temperature ° C. | Sintering Time h | Pulverizing Method / | Mpa | Product / |
|---|---|---|---|---|---|---|
| Example 1 | 30 | 650 | 26 | air-pulverizing | 1.0 | A1 |
| Example 2 | 20 | 600 | 30 | air-pulverizing | 0.5 | A2 |
| Example 3 | 13 | 1000 | 4 | air-pulverizing | 0.8 | A3 |
| Example 4 | 10 | 920 | 12 | air-pulverizing | 0.2 | A4 |

TABLE 1-continued

| Example | Heating Rate °C./min | Sintering Temperature °C. | Sintering Time h | Pulverizing Method / | Mpa | Product / |
|---|---|---|---|---|---|---|
| Example 5 | 25 | 700 | 22 | air-pulverizing | 0.3 | A5 |
| Example 6 | 15 | 960 | 8 | air-pulverizing | 0.7 | A6 |
| Example 7 | 23 | 850 | 18 | air-pulverizing | 0.4 | A7 |
| Example 8 | 18 | 750 | 20 | air-pulverizing | 0.6 | A8 |
| Comparative Example | 35 | 930 | 10 | ball-milling | 30 min | ZH5000S |

TABLE 2

| Example | 110 2θ | Full width at half maximum (FWHM) | Particle Size | Average Sphericity | Cumulative Percentage of particles having a particle Diameter of less than 5 μm | Particle Diameter of mono-crystal under SEM | D50 μm | BET m²/g |
|---|---|---|---|---|---|---|---|---|
| Example 1 | 64.91 | 0.08 | 989 | 0.933 | 84.4 | 0.6~3.6 | 2.2 | 0.86 |
| Example 2 | 64.90 | 0.07 | 900 | 0.935 | 76.2 | 0.7~4.8 | 3.0 | 0.82 |
| Example 3 | 64.89 | 0.15 | 2000 | 0.949 | 85.8 | 0.8~7.8 | 6.4 | 0.58 |
| Example 4 | 64.86 | 0.13 | 1653 | 0.939 | 84.19 | 0.6~6.8 | 5.2 | 0.54 |
| Example 5 | 64.88 | 0.09 | 1058 | 0.931 | 72.1 | 0.5~4.4 | 4.5 | 0.69 |
| Example 6 | 64.97 | 0.14 | 1772 | 0.918 | 74.5 | 0.9~6.7 | 3.8 | 0.62 |
| Example 7 | 64.98 | 0.11 | 1231 | 0.913 | 88.7 | 0.7~6.3 | 7.6 | 0.46 |
| Example 8 | 64.92 | 0.10 | 1487 | 0.905 | 90.2 | 0.5~9.2 | 8.0 | 0.30 |
| Comparative Example | 64.95 | 0.18 | 608 | / | / | / | 6.6 | 0.72 |

TABLE 3

| Example | Button battery Capacity (mAh/g) at 4.2-3.0 V 0.1 C | Full Cell Capacity(mAh/g) at 4.2-3.0 V 1.0 C | Capacity retention ratio after 300 cycles(%) at 4.2 V 45° C. 1.0 C | Capacity retention ratio after 100 cycles(%) at 4.4 V 45° C. 1.0 C |
|---|---|---|---|---|
| Battery Model | CR2430 | 454261 | 454261 | 454261 |
| Example 1 | 152.0 | 150.0 | 92.3 | 91.2 |
| Example 2 | 165.0 | 162.0 | 91.9 | 90.5 |
| Example 3 | 151.0 | 149.0 | 93.1 | 91.0 |
| Example 4 | 152.0 | 147.0 | 94.2 | 92.5 |
| Example 5 | 151.5 | 148.0 | 93.5 | 91.6 |
| Example 6 | 153.2 | 151.0 | 93.8 | 92.1 |
| Example 7 | 184.7 | 178.0 | 91.3 | 90.2 |
| Example 8 | 154.0 | 152.0 | 92.8 | 91.6 |
| Comparative Example | 153.0 | 152.0 | 89.5 | 87.5 |

The experiments of example 1 to 8 and comparative example showed that, a lithium-nickel-cobalt-manganese composite oxide cathode material of a spherical or spherical-like layered structure was prepared by the methods of the present invention. In the scanning electron microscope, the morphology of the cathode material was mainly spherical or spherical-like primary mono-crystal particles and occasionally secondary agglomerated particles. A content of the secondary agglomerated particles was no more than 35%, wherein the particle size of the primary mono-crystal particles was 0.5 to 10 μm, and cumulative percentage of the particles having a particle diameter of 5 μm or less was more than 60%, specifically 72.1% to 90.2%. In the powder X-ray diffraction spectrum (XRD), full width at half maximum (FWHM) of 110 diffraction peak which was in the vicinity of the diffraction angle 2 theta of 64.9° was 0.07 to 0.15, preferably 0.09 to 0.14. The average crystallite size of the crystal is greater than or equal to 900 Å and less than or equal to 2000 Å, preferably 1487 to 1653 Å. It also could be seen that the average sphericity of the cathode material of the present invention is 0.905 to 0.949. However, the morphology of the cathode material prepared by the comparative example showed that the particles were mainly secondary agglomerated particles. In the powder X-ray diffraction spectrum (XRD), full width at half maximum (FWHM) of 110 diffraction peak which was in the vicinity of the diffraction angle 2 theta of 64.9° was 0.18. The structural stability of the material was relatively poor, especially in the high temperature or high voltage, and the cycling capacity retention ratio of the battery made of the material significantly decreased with the increase of cycling numbers.

The invention claimed is:

1. A lithium-nickel-cobalt-manganese composite oxide cathode material of a spherical or spherical-like layered structure, wherein a chemical formula of said cathode material is: $Li_aNi_xCo_yMn_zO_2$, wherein $1.0 \leq a \leq 1.2$, $0.30 \leq x \leq 0.90$, $0.05 \leq y \leq 0.40$, $0.05 \leq z \leq 0.50$, and $x+y+z=1$;

wherein said cathode material powder comprises primary mono-crystal particles of a morphology of spherical or spherical-like and a small amount of secondary agglomerated particles under scanning electron microscopy (SEM); and wherein, a particle diameter of the primary mono-crystal particles is 0.5 to 10 μm, and a cumulative percentage of particles with a particle diameter of less than 5 μm is greater than 60%;

wherein the cathode material is a single α-NaFeO$_2$ type layered structure shown by a powder X-ray diffraction pattern of the cathode material, and full width at half maximum (FWHM) of (110) diffraction peak which is in the vicinity of the diffraction angle 2 theta of 64.9° is 0.07 to 0.15, and an average crystallite size is greater than or equal to 900 Å and less than or equal to 2000 Å.

2. The lithium-nickel-cobalt-manganese composite oxide cathode material of a spherical or spherical-like layered structure according to claim 1, wherein a specific surface area of the cathode material is 0.3 to 0.9 m$^2$/g measured by BET method.

3. The lithium-nickel-cobalt-manganese composite oxide cathode material of spherical or spherical-like layered structure according to claim 1, wherein a median diameter of the cathode material is 2.0 to 8.0 μm.

4. A lithium ion battery is characterized by comprising the cathode material of claim 1 as a positive electrode active material.

5. The positive electrode for a lithium ion battery according to claim 4, wherein a specific surface area of the cathode material is 0.3 to 0.9 m$^2$/g measured by BET method.

6. The positive electrode for a lithium ion battery according to claim 4, wherein a median diameter of the cathode material is 2.0 to 8.0 μm.

* * * * *